No. 704,773. Patented July 15, 1902.
A. J. BEHRENS.
TANK HOOP LUG.
(Application filed Apr. 9, 1902.)
(No Model.)
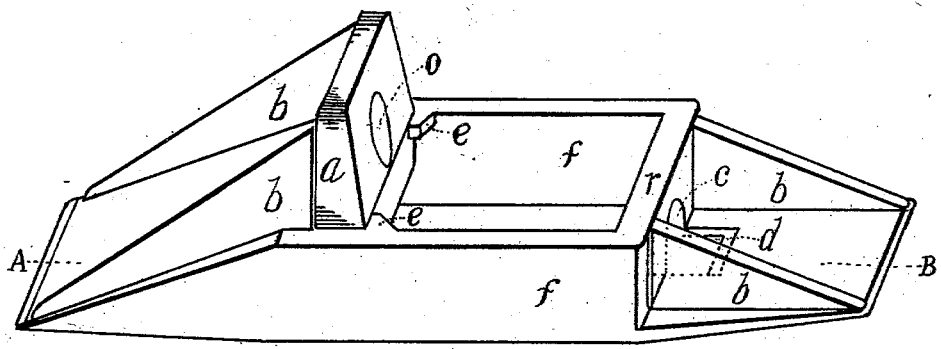
Fig. 1.
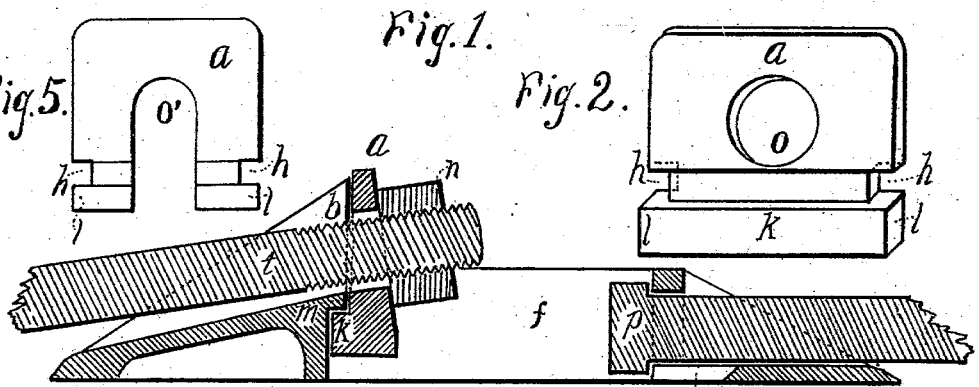
Fig. 5.   Fig. 2.
Fig. 3.
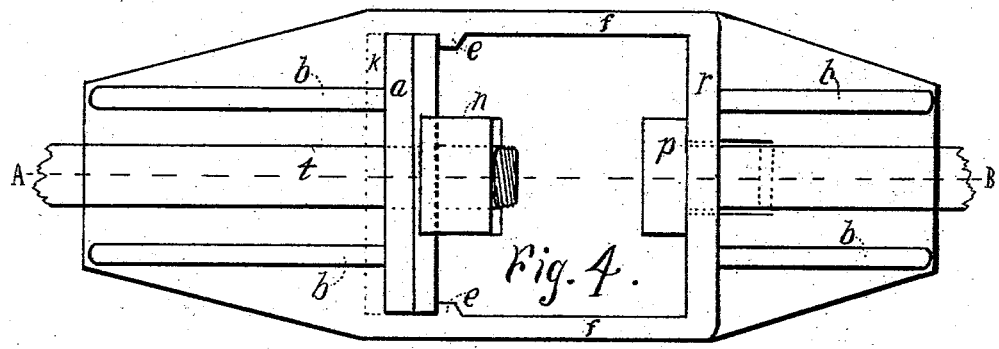
Fig. 4.
Witnesses.
Florence Packer
M. Cleary
Inventor.
Albert J. Behrens.
Per: O. H. Packer
Attorney.

UNITED STATES PATENT OFFICE.

ALBERT J. BEHRENS, OF SAN FRANCISCO, CALIFORNIA.

TANK-HOOP LUG.

SPECIFICATION forming part of Letters Patent No. 704,773, dated July 15, 1902.

Application filed April 9, 1902. Serial No. 102,143. (No model.)

*To all whom it may concern:*

Be it known that I, ALBERT J. BEHRENS, a citizen of the United States, residing at San Francisco, State of California, have invented an Improved Tank-Hoop Lug, of which the following is a specification.

My invention is an improvement in tank-hoop lugs such as are used to secure the ends of hoops on large tanks, wooden circular flumes, silos, barrels, casks, &c.; and the principal objects of my invention are, first, to facilitate securing the lug or shoe to the headed end of the hoop; second, to avoid the difficult task of forcing the threaded end of the hoop through a hole in the lug or shoe; third, to permit the nut to be turned easily and rapidly with a wrench, and, fourth, to secure the washer to the lug. I accomplish these objects by means of the device illustrated in the accompanying drawings, in which—

Figure 1 is a perspective view of the lug with the washer in place; Fig. 2, a perspective view of the washer; Fig. 3, a vertical section through A B, Fig. 1, or along the broken line, Fig. 4. Fig. 5 is a front view of the washer with a slotted opening.

Similar letters refer to similar parts throughout the drawings.

The body of the lug $f$, which I designate as the "shoe," has an opening $c\,d$, through which the hoop, consisting of a rod of round iron, is passed. A portion $c$ of this opening is in the vertical bridge $r$ of the shoe, and a portion $d$ is in the bed-plate of the shoe. This is to facilitate stringing the shoe on the hoop-rod. Wings $e\,e$ project from the body of the shoe, which fit in grooves $h$, cast in the washer $a$. The purpose of these wings is to hold the washer $a$ in place. Ribs $b\,b\,b\,b$ serve to strengthen the shoe. The washer $a$ is shown in Figs. 2 and 5. The opening $o$ may be circular or elongated in shape, or it may be a slot extending to the exterior of the washer, as shown at $o'$, Fig. 5. My washer has grooves $h\,h$ cast therein, designed to fit over wings $e\,e$ on the shoe, and it also has a projecting lip $k$, designed to fit beneath a projection $m$ on the shoe. The grooves $h\,h$ and the lip $k$, with their complements on the shoe, are for the purpose of holding the washer in place when the hoop-rod is tightened by means of the nut $n$. When the nut $n$ is loosened, the washer can be detached from the shoe.

In practice my lug is used as follows: The shoe is strung on the hoop-rod by inserting the rod through the opening $c\,d$. The hoop is then placed around the tank and held in position by nails, as usual. The washer, with either circular or slotted opening, is placed on the threaded end of the hoop-rod and the nut given a few turns. The hoop is then sprung into place, the washer being brought into the square opening in the shoe, when upon being released the spring of the rod will bring the washer into place with the wings $e\,e$ of the shoe in the grooves $h\,h$ of the washer and the lip $k$ of the washer under the projection $m$ of the shoe. The nut can now be tightened as usual.

There is more freedom for turning the nut than in lugs heretofore in use so far as I am aware. The washer is made with an angle between the face and back of it to cause the nut to lie flat against it, and the opening $o$ is made large enough to permit considerable freedom of motion of the hoop-rod therein to prevent cramping or injuring the threads. The angle between the front and back of the washer is preferably made greater for small tanks than for large ones.

The grooves $h\,h$ of the washer $a$ and the wings $e\,e$ of the shoe $f$ may be omitted, retaining the lip $k$ on the washer and the projection $m$ on the shoe, or the lip $k$ of the washer and the projection $m$ of the shoe may be omitted, retaining the wings $e\,e$ of the shoe and the grooves $h\,h$ of the washer when the lugs are designed for small tanks not requiring such great strength to hold the washer in place in the shoe. I do not dispense with the grooves $h\,h$ and the lip $k$ of the washer and the wings $e\,e$ and projection $m$ of the shoe in the same lug, for that would destroy one of the principal features of my invention.

I am aware that washers with circular and variously-shaped openings, including slotted openings, are common articles of commerce, and I do not claim such a simple washer with such openings; but I do claim the following:

1. The combination, in a tank-hoop lug, of a movable washer having a lip designed to fit beneath a projection on the body of the shoe and an opening to receive the threaded end of the hoop-rod, with a shoe having an opening to receive the hoop-rod and a projection designed to fit over a lip on the washer, all as described and for the purposes specified.

2. The combination, in a tank-hoop lug, of a movable washer having grooves designed to fit wings on the shoe and an opening designed to receive the threaded end of the hoop-rod, with a shoe having wings designed to fit grooves in the washer and having an opening designed to receive the hoop-rod, all as described and for the purposes specified.

3. The combination, in a tank-hoop lug, of a washer having its two faces at an angle with each other and having grooves designed to fit wings on the shoe and a lip designed to fit beneath a projection on the shoe, with a shoe having wings and a projection designed to fit grooves and a lip respectively on the washer and having an opening designed to receive the hoop-rod, all as described and for the purposes specified.

ALBERT J. BEHRENS.

Witnesses:
O. H. PACKER,
FRANK L. OWEN.